W. MEHRMANN.
HANGER FOR PICTURE FRAMES.
APPLICATION FILED SEPT. 27, 1913.
1,107,686.   Patented Aug. 18, 1914.
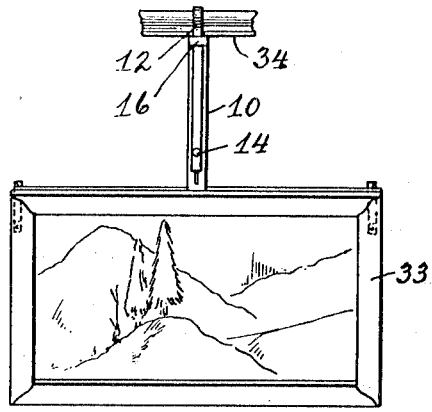
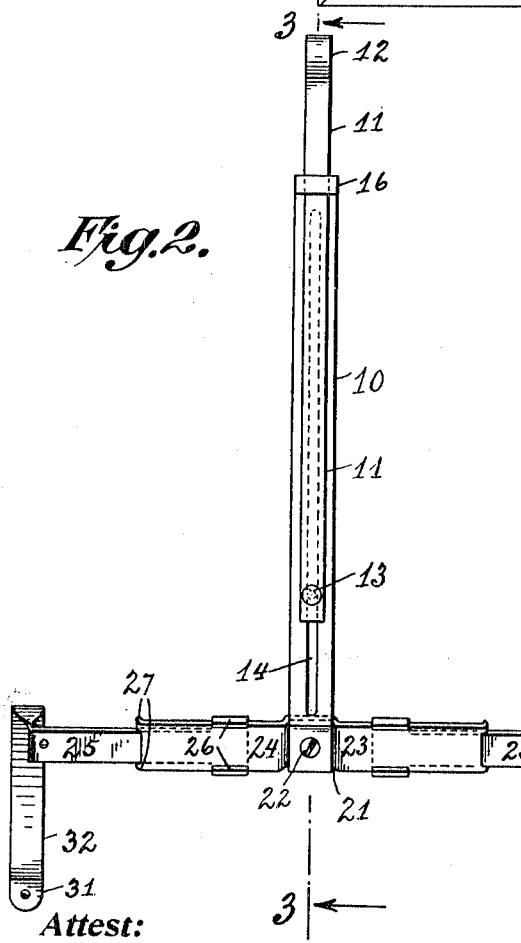
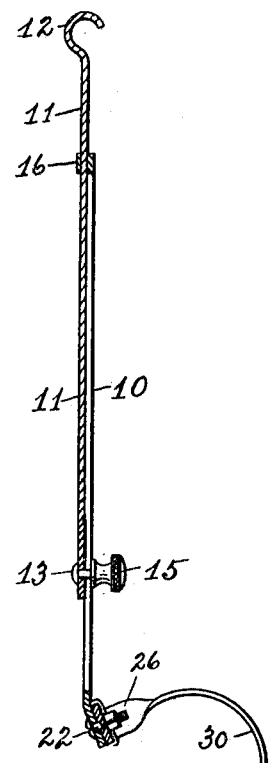
Attest:
Helen V. Fitzpatrick
Mary L. Lewis
William Mehrmann, Inventor:
by William R. Baird
his Atty.

UNITED STATES PATENT OFFICE.

WILLIAM MEHRMANN, OF BROOKLYN, NEW YORK.

HANGER FOR PICTURE-FRAMES.

1,107,686.  Specification of Letters Patent.  Patented Aug. 18, 1914.

Application filed September 27, 1913. Serial No. 792,236.

*To all whom it may concern:*

Be it known that I, WILLIAM MEHRMANN, a citizen of the United States, residing at Brooklyn, in the county of Kings and State of New York, have invented certain new and useful Improvements in Hangers for Picture-Frames, of which the following is a specification.

This invention relates to hangers for picture frames or the like, and its novelty consists in the construction and adaptation of the parts, as will be more fully hereinafter pointed out.

In the drawings, Figure 1 is a front elevation of a device embodying the invention showing the same secured to a picture and suspended from the usual molding; Fig. 2 is an enlarged front elevation, concealed parts being shown in dotted outline, and Fig. 3 is a side elevation partly in section on the plane of the line 3—3 in Fig. 2.

In the drawings, 10 is a rigid vertical suspension member provided with means whereby its effective length may be varied consisting of a supplementary member 11 having a hook 12 at its upper end and adapted to slidably engage the member 10 by means of a threaded bolt 13, the body of which is adapted to move in a longitudinal slot 14 formed in the member 10. A knurled thumb nut 15 prevents the disengagement of the bolt from the slot. A guard 16 secured to the member 10 at its front side and adapted to surround the member 11 and hold it against the surface of the member 11, also prevents the disengagement of the member 11 from the member 10 while permitting the former to slide along the latter.

A rigid horizontal member is adapted to be secured to the vertical member 10 at about the middle of the former. In the form of the device shown, this member is provided with an offset or recess 21 adapted to receive the lower end of the member 10 and to prevent the latter from lateral displacement by the engagement of the edges of such member 10 with the side walls of such recess. Any suitable means may be employed to secure the vertical and horizontal members together, and means shown being a bolt and nut indicated at 22. As the vertical member is secured at about the middle of the horizontal member the latter, in effect, comprises two laterally extending arms 23 and 24.

Means are provided for varying the effective length of each arm consisting of a supplementary member 25 provided at its inner end with flanges forming, in effect, a sleeve 26 adapted to engage the edges of the arm to which it is secured and along which it is adapted to slide. Each arm 23 and 24 is provided with terminal ears 27 serving as guides and positioners for the supplementary arm and between which it is adapted to slide so that its position is determined positively with respect to the longitudinal axis of each arm. Each supplementary member 25 is bent laterally and curved downwardly into a plane substantially at right angles to the plane of the horizontal member to form a bracket 30 terminating in a flange 31 having an aperture 32 to receive a fastening member such as a screw whereby it may be secured to the picture frame indicated at 33. As it is intended that the device shall be formed of relatively thin metal this bracket has an elastic quality which adds to its usefulness by affording a cushioning support to the picture frame.

In use, the two supplementary arms are secured to the side members of the picture frame at any convenient place. The vertical member is then set into a medial position with respect to such arms and rigidly secured in position by means of the nut and bolt 22, and the effective length of the vertical member is then varied to suit the position of the picture on the wall, the thumb nut 15 being used to secure the members 10 and 11 in position after such adjustment, and the hook 12 is then placed on the usual picture molding indicated at 34.

As will be seen, the parts of the device are rigid, they can not be accidentally displaced relatively as the connecting means are positive, the position of the picture can not be varied (except that it may be slid along the molding), and there is no danger of the parts disintegrating, as a cord or wire will sometimes do, and permitting the picture to fall.

What I claim is:

1. A hanger for picture frames or the like, comprising a vertical member, a horizontal member secured to the vertical member, said horizontal member provided on its ends with rearwardly curved downwardly extending elastic members adapted to be secured to a picture frame.

2. A hanger for picture frames or the like, consisting of an adjustable vertical support, a horizontal member secured to said vertical support, supplemental members adjustably supported on the horizontal member, the outer end of each supplemental member terminating in a downwardly extending bow at right angles to the body portion said supplemental member to form a bracket and a flange at the end of each bracket, thereby affording securing means whereby the bracket is secured to the picture.

In testimony whereof I affix my signature in presence of two witnesses.

WILLIAM MEHRMANN.

Witnesses:
HELEN V. FITZPATRICK,
MARY H. LEWIS.

Copies of this patent may be obtained for five cents each, by addressing the "Commissioner of Patents, Washington, D. C."